Patented Oct. 6, 1953

2,654,652

UNITED STATES PATENT OFFICE 2,654,652

DYEING OF ACRYLONITRILE POLYMERS WITH ACETATE DYES

Linton G. Ray, Jr., Kenmore, N. Y., assignor to E. I. du Pont de Nemours & Company, Wilmington, Del., a corporation of Delaware No Drawing. Application August 2, 1949,
Serial No. 108,235

6 Claims. (Cl. 8—4)

This invention relates to the modification of polymers of acrylonitrile. More particularly it relates to the dyeing of shaped articles comprising acrylonitrile polymers.

Acrylonitrile polymers containing a major portion of acrylonitrile are relatively insoluble, unreactive and hydrophobic materials. These characteristics make the dyeing of structures prepared from such polymers a difficult problem. Standard commercial dyeing techniques cannot be used satisfactorily. For example, only light shades are obtained on dyeing structures of polyacrylonitrile with acetate, basic and certain vat colors. Since the physical and chemical properties of shaped articles prepared from acrylonitrile polymers make the articles of considerable commercial interest, solutions to the difficult dyeing problems are highly desirable.

Accordingly, it is an object of this invention to provide a satisfactory process for dyeing structures prepared from acrylonitrile polymers. A further object is the provision of methods for uniformly dyeing structures of acrylonitrile polymers. A still further object is the provision of dyed structures of such polymers which are deeply and uniformly dyed and which are fast to light and to washing. Other objects will appear hereinafter.

The objects of this invention are accomplished by padding the acrylonitrile polymer structure with a concentrated liquor of a dispersed acetate type dyestuff in a cyclic organic ester of the type to be described hereinafter and treating the wet pad with water saturated steam.

The cyclic organic esters which can be used in the process of this invention are the lactones and cyclic carbonate esters which contain from 3–5 carbon atoms in the molecule. Among the more important cyclic esters may be mentioned propiolactone, gamma-butyrolactone, valerolactone, ethylene cyclic carbonate, propylene cyclic carbonate, trimethylene cyclic carbonate, tetramethylene cyclic carbonate, 2,3-butylene cyclic carbonate, and chlormethyl ethylene carbonate. These materials are solvents for polymers containing a major portion of acrylonitrile units. However, solvents for acrylonitrile polymers cannot be used in the practice of this invention, in general. In fact, none of the solvents described in U. S. 2,404,714–2,404,727, inclusive, are applicable. Particularly surprising is the fact that dimethyl formamide, a good solvent for polyacrylonitrile and also a good solvent for acetate dyestuffs, cannot be used.

Meta-cresol has been described in co-pending application Ser. No. 771,381, now Patent No. 2,512,969, as a good dye assistant in the dyeing of acrylonitrile polymer structures with dispersed acetate and basic colors in boiling aqueous baths. When used in the invention described herein, meta-cresol gives only fair results. On the other hand, the cyclic organic esters described herein cannot be used effectively as assistants in pot dyeing unless 10–25% concentrations, based on the bath, are employed. This, of course, is not economical.

The invention will be more clearly understood by referring to the examples and discussion which follow. These examples are given for illustrative purposes and are not to be construed in any sense as limitative. Parts, proportions and percentages are by weight unless otherwise indicated.

Example I

Fabric prepared from polyacrylonitrile yarn was padded with a solution prepared from 5 parts of ethylene cyclic carbonate, 5 parts of water and 1 part of 1,4,5,8-tetraamino-anthraquinone at room temperature. Excess padding liquor was allowed to drain off and the fabric was shown to have picked up solution equal to 70% of its own weight. The wet padded fabric was then immediately treated for 12 minutes with atmospheric pressure steam, rinsed several times in dimethyl formamide to remove excess dye from the surface, rinsed in water and finally ironed dry. The fabric was colored a deep blue shade and spectro-photometric analysis of the dye retained by the fabric proved it to have absorbed 5% of the commercial dyestuff. This dyeing was fast to washing and to crocking. Upon examination of cross-sections of the dyed yarn, it was found that the dye penetrated the fiber completely. In comparison, a similar dyeing experiment using a padding liquor containing no ethylene carbonate, yielded a product so light in color that an accurate analysis for dye content could not be made.

Example II

Fabric prepared from polyacrylonitrile yarn was padded with a solution prepared from 5 parts of gammabutyrolactone, 5 parts of water and 1 part of 1,4,5,8-tetraaminoanthraquinone at room temperature. Excess padding liquor was allowed to drain off and the fabric was shown again to have picked up solution equal to 70% of its own weight. The wet padded fabric was immediately treated for 5 minutes with atmospheric pressure steam. The fabric sample was then scoured for ½ hour at 100° C. in a ½% soap solution. It was finally rinsed with water and dried. Again, an excellent deep shade of blue fast to washing and to crocking was obtained on the fabric.

*Example III*

The experiment described in Example II was repeated in every detail using a pad liquor consisting only of 10 parts of gamma-butyrolactone and 1 part of dyestuff. There was no fabric damage due to solvent action of the lactone and the shade of blue obtained on the fabric was substantially indistinguishable from that obtained in Examples I and II.

*Example IV*

A fabric prepared from polyacrylonitrile yarn was padded with a liquor consisting only of 10 parts of propylene cyclic carbonate and 1 part of 1-amino-2-methyl-anthraquinone at room temperature. The wet padded fabric was treated for 10 minutes with atmospheric pressure steam, rinsed several times in dimethyl formamide, then in water and ironed dry. The fabric was colored a deep orange shade.

*Example V*

A fabric prepared from polyacrylonitrile yarn was padded with a liquor consisting only of 10 parts of 2,3-butylene cyclic carbonate and 1 part of 1-hydroxy-4-aminoanthraquinone at room temperature. The wet padded fabric was treated for 8 minutes with atmospheric pressure steam. After scouring, rinsing and drying as described in Example II, the fabric retained a deep shade of red.

For economic reasons, gamma-butyrolactone and ethylene cyclic carbonate are the preferred cyclic organic esters to be used in the process of this invention. These two materials are the cheapest and most readily available at the present time.

The depth of shade obtained in dyeing polyacrylonitrile articles by the process of this invention depends greatly upon the concentration of organic cyclic ester in the padding liquor, particularly when below 50%. For example, using a padding liquor comprising 25% ethylene carbonate and 75% water and steaming at 100° C. for 12 minutes, only a minor improvement in dyeability of polyacrylonitrile yarn was obtained over a control. Accordingly, it is preferred to use concentrations of organic cyclic ester ranging from 50-100% in the padding liquor. When the cyclic ester does not make up 100% of the padding liquor, the remainder is most suitably water, although other materials miscible with the cyclic organic ester but inert to it and to the acrylonitrile polymer, may be used, such as alcohols, ketones or ethers. Salts, soaps and other common additives may be incorporated in the padding liquor but are superfluous in the operation of this invention.

The concentration of dyestuffs in the padding liquor is not critical. Ten per cent by weight of dyestuffs, based on the weight of the dispersing liquid, is ample, although more or less may be used as desired. The weight of padding liquor, which comprises the dyestuff and the cyclic esters of this invention, is not critical. One skilled in the art will use an amount of dyestuff and ester which depends upon the amount of fabric he is dyeing and the extent of dyeing he desires.

It is essential that structures padded with 100% concentrations of the cyclic esters be given a wet steam treatment. Dry heat has a deleterious effect on the padded structure. Since wet steam must be used, there is nothing to be gained by drying the padded structure before steaming. In any case, the padded fabric should not be dried prior to steaming because such drying causes removal of the cyclic organic ester and its effect is lost.

The steam treatment should be carried out for at least 5 minutes for the best results. While steaming may be carried out as long as desired, in general, there is nothing to be gained by steaming for more than 15 minutes. The time can be shortened by using steam under pressure but this, of course, necessitates the use of special equipment. Temperatures of from 100° C. to 150° C. may be used with temperatures of 100° C. to 130° C. being preferred. In general, conventional dyeing apparatus and procedures, such as purification methods, may be used in this invention.

This invention is particularly suitable for dyeing acrylonitrile polymer structures of any shape with dispersed acetate dyestuffs, particularly those containing a primary amine group attached to an aromatic ring. The basic dyestuffs may also be applied to acrylonitrile polymer structures by the process described herein but they are seldom used because their light fastness properties are unsatisfactory. Among the many dyes of these classes that may be used in this invention are the following: p-nitroaniline→aniline, 4-aminoazobenzene, 4,4'-diaminoazobenzene, 1,4,5,8 - tetraaminoanthraquinone, 1 - amino-2-methyl anthraquinone, 1-hydroxy-4-aminoanthraquinone, fuchsin, malachite green, 4-aminoacetophenone→aniline, and methyl violet. Excess dye is removed by scouring the fabric or by rinsing with a good dyestuff solvent, such as dimethyl formamide, as described in the examples and strong wash-fast coloration is obtained. Any of the above dyes may be and have been used with excellent results in place of the particular dyes used in the cited examples.

The acrylonitrile polymers which are generally used commercially to form the shaped articles described in this invention are those having a sufficiently high molecular weight to possess film- or filament-forming properties. The polymers employed possess an average molecular weight within the range of 25,000 to 750,000 or even higher, and preferably between the range of 40,000 and 250,000 as calculated from viscosity measurements by the Staudinger equation. It is to be understood, however, that acrylonitrile polymers having molecular weights below or above the range indicated may be dyed by the process of this invention.

Acrylonitrile polymers containing at least 85% by weight of the polymer, of acrylonitrile, are of particular commercial interest. These polymers include polyacrylonitrile and copolymers and interpolymers of acrylonitrile with other polymerizable monomers. These monomers include, among others, vinyl acetate, vinyl chloride, acrylic and methacrylic acids or derivatives and homologues thereof, styrene, methyl vinyl ketone, vinyl pyridines, such as 2-vinyl, 4-vinyl, 5-ethyl-2-vinyl or 2-methyl-5-vinyl pyridine, and isobutylene or other similar polymerizable hydrocarbons. The process of this invention can be used to dye such polymers. However, since these copolymers of acrylonitrile are more soluble than polyacrylonitrile, the concentration of cyclic ester must be decreased to less than 50% of the padding liquor when interpolymers are dyed by this process in order to avoid fabric degradation.

The yarns described herein are prepared by conventional wet or dry spinning techniques from solutions of polyacrylonitrile or copolymers containing 85% or more acrylonitrile in dimethyl formamide, tetramethylene sulfone or other known volatile solvents for these polymers, such as those described in U. S. Patents 2,404,714 to 2,404,727, inclusive. On leaving the spinning cell, the yarn is collected in a suitable package and this yarn package may then be washed free of residual solvent. In order to obtain full benefit of the properties of these yarns, it is desirable to draw the yarn from 2 to 10 times its original length. Moreover, when heated under tension for extended periods of time, the yarns show a remarkable retention of tenacity; while, on the other hand, if the yarns after drawing are heated in the relaxed state at temperatures in the order of 130° to 200° C., they tend to shrink somewhat and such an after-treatment can be used to increase the elongation of the yarn to a point where they are satisfactory for use in the textile art.

Any of the structures, such as yarns, films, fabrics and the like, may be prepared by the usual techniques. For example, yarns and fibers may be prepared by dry or wet spinning, as described, for example, in U. S. 2,426,719. Films may be prepared in similar ways, or by casting techniques. Fabrics may be prepared by any of the well-known knitting or weaving techniques.

Normally, structures prepared from acrylonitrile polymers cannot be dyed satisfactorily with any dye, such as acid, direct, sulfur, acetate, basic or vat colors. At best only light shades are obtained with acetate, basic and certain vat dyes in standard processes. By the process of this invention, it is possible to obtain satisfactory dyeing with dispersed acetate and basic dyes.

This invention provides a convenient and valuable method for dyeing structures prepared from acrylonitrile polymers. By the novel process of this invention difficultly dyed structures of acrylonitrile polymers can be dyed readily at a rapid rate using standard commercial equipment. The colored products produced are dyed to deeper shades than hitherto obtainable. Further, the dyed products have exceptionally good resistance to washing and crocking. The structures are colored throughout and have excellent resistance to wear by scratching or scuffing. Furthermore, the physical and chemical properties of the dyed structures are comparable to the desirable properties of the undyed structures.

Any departure from the procedure described herein which conforms to the principles of the invention is intended to be included within the scope of the claims below.

I claim:

1. A process for dyeing a structure of an acrylonitrile polymer derived from at least 85% by weight of acrylonitrile which comprises padding said structure with a mixture of an acetate dye dispersed therein and a dispersing liquid comprising 25% to 100% of a cyclic ester containing from 3 to 5 carbon atoms; and wet steaming the resultant padded structure for at least about 5 minutes to effect said dyeing.

2. A process in accordance with claim 1 in which said polymer is polyacrylonitrile.

3. A process in accordance with claim 1 in which said ester is gamma-butyrolactone.

4. A process in accordance with claim 1 in which said ester is ethylene cyclic carbonate.

5. A process in accordance with claim 1 in which said wet steaming is done at a temperature of about 100° C. to about 130° C.

6. A process in accordance with claim 1 in which said dye is present in amounts of about 10% based on the weight of said dispersing liquid.

LINTON G. RAY, Jr.

References Cited in the file of this patent

UNITED STATES PATENTS

| Number | Name | Date |
|---|---|---|
| 2,131,098 | Dreyfus | Sept. 27, 1938 |
| 2,431,956 | Moody | Dec. 2, 1947 |
| 2,512,969 | Richards | June 27, 1950 |
| 2,524,811 | Koberlein | Oct. 10, 1950 |
| 2,535,098 | Shorey | Dec. 26, 1950 |
| 2,543,316 | Feild | Feb. 27, 1951 |

FOREIGN PATENTS

| Number | Country | Date |
|---|---|---|
| 883,764 | France | Mar. 29, 1943 |
| 896,083 | France | Apr. 17, 1944 |
| 599,055 | Great Britain | Mar. 3, 1948 |

OTHER REFERENCES

Rayon Textile Monthly for September 1946, page 140 (496).

Rayon and Syn. Tex. for March 1949, page 70.

Dedication 2,654,652.—*Linton G. Ray, Jr.*, Kenmore, N.Y. DYEING OF ACRYLONITRILE POLYMERS WITH ACETATE DYES. Patent dated Oct. 6, 1953. Dedication filed Jan. 22, 1964, by the assignee, *E. I. du Pont de Nemours and Company*.

Hereby dedicates to the public the entire terminal part of said patent.
[*Official Gazette April 14, 1964.*]